United States Patent [19]

Blaydon

[11] 4,166,628

[45] Sep. 4, 1979

[54] GREASE PURGEABLE BUSHING SEAL

[75] Inventor: Thomas J. Blaydon, Lincolnton, N.C.

[73] Assignee: Garlock Inc., Palmyra, N.Y.

[21] Appl. No.: 474,385

[22] Filed: May 30, 1974

[51] Int. Cl.$^2$ .............................................. F16J 15/32
[52] U.S. Cl. ..................................... 277/152; 277/182
[58] Field of Search .................. 277/205, 212, 212 C, 277/182, 181, 188, 189, 183

[56] References Cited

U.S. PATENT DOCUMENTS

| | | | |
|---|---|---|---|
| 1,580,701 | 4/1926 | Travers | 277/183 |
| 2,816,784 | 12/1957 | Stucke | 277/152 |
| 2,930,643 | 3/1960 | Mastrobattista et al. | 277/153 |

FOREIGN PATENT DOCUMENTS

| | | | |
|---|---|---|---|
| 1305446 | 8/1962 | France | 277/152 |

*Primary Examiner*—Robert I. Smith
*Attorney, Agent, or Firm*—Schovee & Boston

[57] ABSTRACT

A narrow cross section (about 0.110 inch) grease purgeable bushing seal that can be installed in the same housing bore diameter as that of the bushing without the need for machining a larger counter bore in the housing, including a metal shell with a radially inwardly turned flange at the bushing side thereof, and an elastomeric sealing element molded and bonded to the shell. To be grease purgeable, the seal parameters must be within the following ranges for the cross-sectional thickness E, the lip clearance A, the lip thickness B, the lip beam length C, the orifice D and the interference i, as follows:

$E \leq 0.100$ inch $+ i$
$i = 0.000$ to $0.015$ inch
$A \geq B$
$B \geq 23\% (E - i)$
$C \geq 45\% (E - i)$
$D \geq 31\% (E - i)$ The seal can also be turned around and used to seal oil in other applications thereof.

7 Claims, 2 Drawing Figures

GREASE PURGEABLE BUSHING SEAL

BACKGROUND OF THE INVENTION

1. Field of the Invention

This invention relates to grease purgeable bushing seals and in particular to a narrow grease purgeable bushing seal that can be installed in the same housing bore diameter as used by the bushing.

2. Description of the Prior Art

In the past it has been general practice, when sealing a bushing having a narrow cross-sectional thickness (i.e. 0.100 inch), that the outside diameter of the seal had to be larger than the outside diameter of the bushing housing. This practice had the two disadvantages of requiring a machining operation of counter-boring the housing bore for the larger outside diameter seal, and also of reducing the strength of the housing at the location of the counter bore. Prior art seals that would fit within the same housing diameter as the bushing were not grease purgeable but would "pop out" under pressure of the grease.

It is a primary object of the present invention to provide a narrow cross-section grease purgeable bushing seal which has the same outside diameter dimension as that of the bushing so that the counter-boring machining operation can be eliminated.

SUMMARY OF THE PRESENT INVENTION

A grease purgeable bushing seal of narrow crosssectional thickness (in range of from about 0.062 to 0.110 inch) and including a shell and an elastomeric sealing element molded and bonded to the shell, is grease purgeable when formed with the parameters: cross-sectional thickness E, lip clearance A, lip thickness B, lip beam length C, interference i, and orifice D, within the following ranges:

$E \leq 0.100$ inch $+ i$
$i = 0.000$ to $0.015$ inch
$A \geq B$
$B \geq 23\% (E-i)$
$C \geq 45\% (E-i)$
$D \geq 31\% (E-i)$.

A seal made with the above listed parameters but having values outside of the above ranges will not be grease purgeable.

BRIEF DESCRIPTION OF THE DRAWINGS

The present invention will be more fully understood by reference to the following detailed description thereof, when read in conjunction with the attached drawing, wherein like reference numerals refer to like elements and wherein.

DETAILED DESCRIPTION OF THE PREFERRED EMBODIMENT

Figure 1:
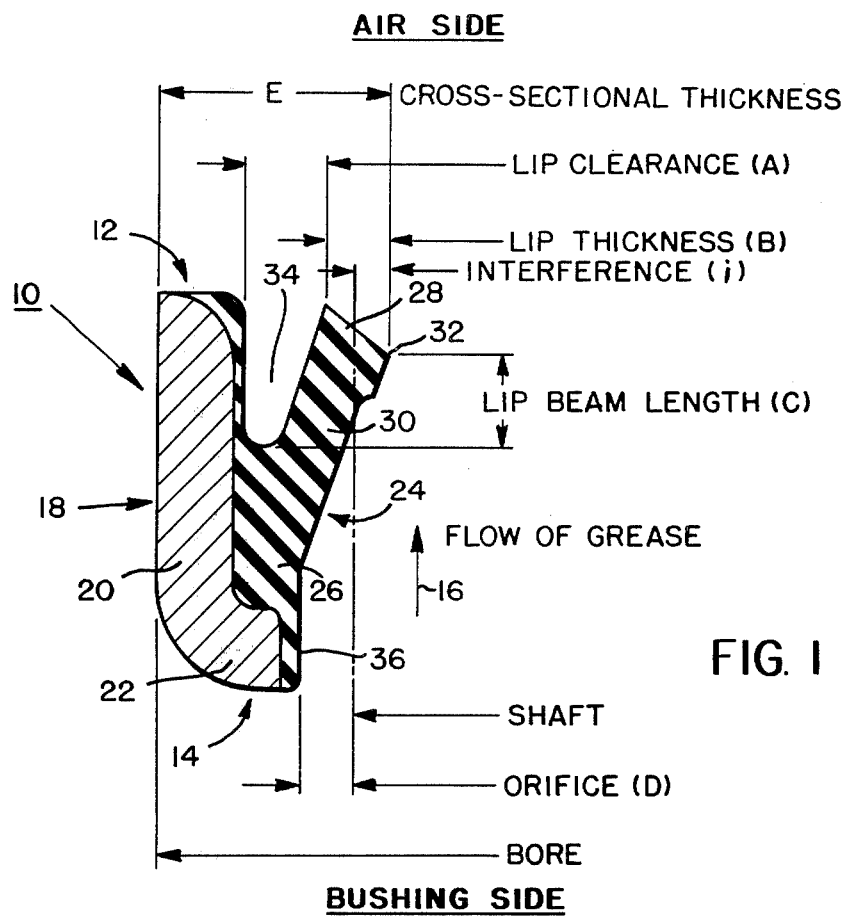
FIG. 1 is one-half of a cross-sectional view through the grease purgeable bushing seal of the present invention.
Figure 2:
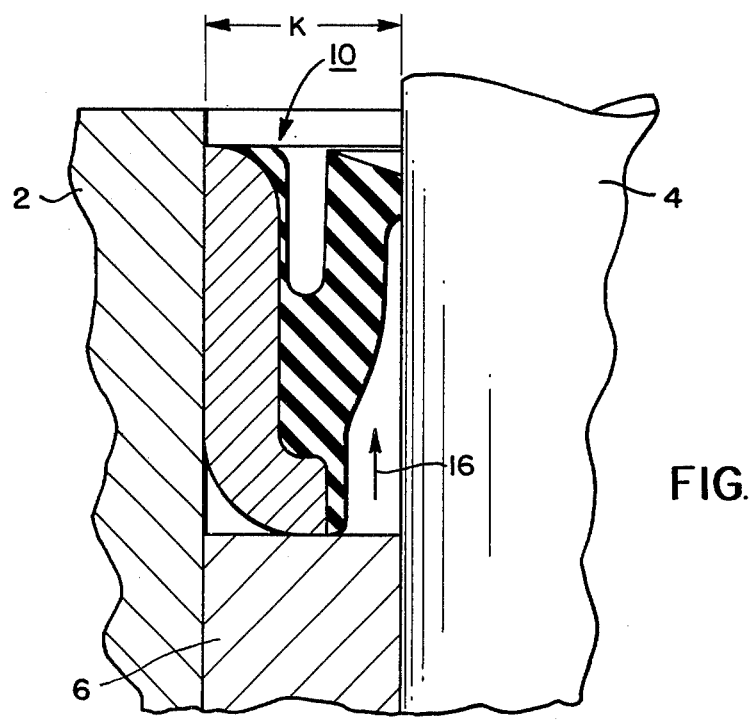
FIG. 2 is one-half of a cross-sectional view through the seal of FIG. 1 as installed between a housing and a shaft to seal a bushing.

With reference now to the drawings, FIG. 1 is one-half of a cross sectional view through a grease purgeable bushing seal 10 made according to the present invention. FIG. 2 shows the seal 10 of FIG. 1 installed in place between a housing 2 and a shaft 4 for sealing a bushing 6. As is well-known in the art, the bushing 6 has grooves in its I.D. surface for lubrication; when additional grease is introduced into these grooves, the seal 10 will not "pop-out" but will allow excess grease to flow out through the space between the seal 10 and the shaft 4. The seal 10 has an air side 12 and a bushing side 14; the flow of grease during purging is indicated by the arrow 16.

For a detailed description of the seal 10, reference will now be made to FIG. 1. The seal 10 has an annular shell 18 of suitable metal or other material including a cylindrical portion 20 and a radially inwardly extending portion or flange 22 at the bushing side 14 thereof. The flange 22 adds strength to the shell 20; the shell preferably has a thickness of about 0.024 inch. An elastomeric sealing element 24 is molded and bonded to the shell 18 and has the shape shown and includes a main body portion 26, a sealing lip portion 28, and a flex portion 30 connecting the two portions 26 and 28. The sealing lip portion 28 includes a sealing lip 32. The flex portion 30 tapers radially inwardly and axially outwardly (out from the housing 2 and bushing 6), leaving an annular channel 34 between the shell 18 and the sealing lip portion 28.

Certain parameters of the seal 10 of the present invention are labelled on the drawing including: a lip clearance A (the width of channel 34 at the entrance thereto), the lip thickness B, the lip beam length C (the distance between the lip 32 and the bottom of the channel 34), the interference i, the orifice D (the distance between the O.D. surface of the shaft on which the seal 10 is to be installed and the I.D. surface of the very thin layer 36 of elastomer on the I.D. surface of the flange 22), and the cross-sectional thickness E of the seal 10. The layer 36 is not essential. It has been found that the seal 10 of the present invention will operate to purge grease when the above parameters are within the following ranges (a seal having parameters outside of these ranges will not purge grease):

$E \leq 0.100$ inch $+ i$
$i = 0.000$ to $0.015$ inch
$A \approx B$
$B \geq 23\% (E-i)$
$C \geq 45\% (E-i)$
$D \geq 31\% (E-i)$ These values for the ranges of the parameters of the seal 10 are with respect to the seal per se as made, rather than for the seal as installed, as shown in FIG. 2. It is noted that the cross-sectional thickness of the seal 10 is from 0.000 to about 0.015 inch (herein defined as "i") greater than the distance E between the housing 2 and the shaft 4.

In the presently preferred embodiment, the values for the various parameters are as follows $E = 0.072$ inch, $i = 0.010$ inch, $B = 0.014$ inch, $C = 0.028$ inch, $D = 0.020$ inch and $A = 0.024$ inch.

In the early stages of developing a seal that would have the same shaft and bore dimensions of a narrow crosssection bushing and also have the additional function of purging grease, no seals were developed that were successful in having both of the above mentioned features until seals were produced with the above-set forth range of parameters.

The seal of the present invention will also work to seal oil; it can thus be turned around and used as an oil seal in other applications than the preferred one described above.

The invention has been described in detail with particular reference to the preferred embodiments thereof, but it will be understood that variations and modifications can be effected within the spirit and scope of the invention as described hereinabove and as defined in the appended claims.

I claim:

1. A narrow cross-section grease purgeable bushing seal for installation in a bore of a housing having a narrow cross-section bushing installed therein, said seal as installed having the same shaft and bore dimensions as does the bushing and comprising:
    (a) a metal shell having a cylindrical portion and a radially inwardly extending portion at the bushing side of the cylindrical portion; and
    (b) an elastomeric sealing element bonded onto the inner surface of said shell and having a main body portion at the bushing side of said shell,
    a flex portion that tapers radially inwardly and axially outwardly from the main body portion and terminating at a sealing lip portion having a sealing lip, said seal having an annular channel between said sealing lip portion and said shell, said seal having a cross-sectional thickness E, a lip clearance A, a lip thickness B, a lip beam length C, an interference i, an orifice D, and wherein the above-mentioned parameters of said seal have the following ranges:
    $E \leq 0.100$ inch $+ i$
    $i = 0.000$ to $0.015$ inch
    $A \geq B$
    $B \geq 23\% (E-i)$
    $C \geq 45\% (E-i)$
    $D \geq 31\% (E-i)$ 2. The article according to claim 1 wherein $E = 0.072$ inch, $B = 0.014$ inch, $C = 0.028$ inch, $D = 0.020$ inch, $i = 0.010$ inch, and $A = 0.024$ inch.

3. An oil seal comprising:
    (a) a metal shell having a cylindrical portion and a radially inwardly extending portion at a bushing side of the cylindrical portion; and
    (b) an elastomeric sealing element bonded onto the inner surface of said shell and having a main body portion at the bushing side of said shell,
    a flex portion that tapers radially inwardly and axially outwardly from the main body portion and terminating at a sealing lip portion having a sealing lip, said seal having an annular channel between said sealing lip portion and said shell, said seal having a cross-sectional thickness E, a lip clearance A, a lip thickness B, a lip beam length C, interference i, and an orifice D, and wherein the above-mentioned parameters of said seal have the following ranges:
    $E \leq 0.100$ inch $+ i$
    $i = 0.000$ to $0.015$ inch
    $A \geq B$
    $B \geq 23\% (E-i)$
    $C \geq 45\% (E-i)$
    $D \geq 31\% (E-i)$ 4. The article according to claim 1 including a housing having a narrow cross-section bore therein and a bushing installed in said bore and said seal being installed in said bore adjacent said bushing.

5. The article according to claim 4 including a shaft extending through said bore in said housing in contact with said bushing and wherein said sealing lip of said seal is in contact with an outer surface of said shaft.

6. A method for sealing a narrow cross-section space between a housing bore and a shaft, the narrow cross-section being about 0.100 inch, wherein a bushing is installed therebetween, comprising:
    (a) installing in said bore a narrow cross-section grease-purgeable bushing seal adjacent said bushing and in sealing contact with said shaft, said seal having the same O.D. as does the bushing and comprising a metal shell having a cylindrical portion and a radially inwardly extending portion at the bushing side of the cylindrical portion; and an elastomeric sealing element bonded onto the inner surface of said shell and having a main body portion at the bushing side of said shell, a flex portion that tapers radially inwardly and axially outwardly from the main body portion and terminating at a sealing lip portion having a sealing lip, said seal having an annular channel between said sealing lip portion and said shell, said seal having a cross-sectional thickness E, a lip clearance A, a lip thickness B, a lip beam length C, an interference i, an orifice D, and wherein the above-mentioned parameters of said seal have the following ranges:
    $E \leq 0.100 + i$
    $i = 0.000$ to $0.015$ inch
    $A \geq B$
    $B \geq 23\% (E-i)$
    $C \geq 45\% (E-i)$
    $D \geq 31\% (E-i)$.

7. The method according to claim 6 including applying grease under pressure to the bushing and purging said grease out of said housing past said seal without said seal popping out of said housing by said elastomeric sealing element moving radially outwardly to allow said grease to be purged.

* * * * *

UNITED STATES PATENT AND TRADEMARK OFFICE
CERTIFICATE OF CORRECTION

PATENT NO. : 4,166,628
DATED : September 4, 1979
INVENTOR(S) : Thomas J. Blaydon It is certified that error appears in the above-identified patent and that said Letters Patent are hereby corrected as shown below:

Claim 6 (a), line 1 of table, after "0.100" insert --inch--.

Signed and Sealed this

Eighteenth Day of December 1979

[SEAL]

Attest:

SIDNEY A. DIAMOND

*Attesting Officer*     *Commissioner of Patents and Trademarks*